United States Patent [19]

Miller

[11] Patent Number: 4,976,031

[45] Date of Patent: Dec. 11, 1990

[54] TELESCOPIC HEDGE TRIMMING APPARATUS

[76] Inventor: Ron Miller, 8 Eagle St., Spring Valley, N.Y. 10977

[21] Appl. No.: 360,076

[22] Filed: Jun. 1, 1989

[51] Int. Cl.$^5$ .............................................. B26B 27/00
[52] U.S. Cl. .................................. 30/296.1; 30/166.3; 30/276
[58] Field of Search ...................... 30/296.1, 381, 166, 30/276

[56] References Cited

U.S. PATENT DOCUMENTS

| | | | |
|---|---|---|---|
| 4,207,675 | 6/1980 | Causey et al. | 30/296.1 |
| 4,651,420 | 3/1987 | Lonnecker | 30/296.1 |
| 4,654,971 | 4/1987 | Fettes et al. | 30/296.1 |

Primary Examiner—Douglas D. Watts
Assistant Examiner—Willmon Fridie, Jr.
Attorney, Agent, or Firm—Schweitzer & Cornman

[57] ABSTRACT

A telescopic cutting apparatus comprising an elongated outer tubular arm of not less than four feet in length; a first handle means coaxial with and closing off the lower end of said outer tubular arm; a biased electrical on/off switch means disposed within said handle means and being normally in the "off" position and requiring constant application of force to be translated into the "on" position. A second handle means mounted proximate the upper end of said outer tubular arm; adjustment means for varying the positioning of said second handle means axially and radially with respect to said outer tubular arm; an inner tubular elongated arm telescopically mounted within said outer tubular arm; locking means associated with said inner and outer tubular arms to lock said inner arm in selected relation to each; trimming means having an electrical motor drive mounted on the upper end of said inner arm; a conductor cord extending from said motor through said arms in series with said switch means and outwardly of said first handle means and terminating in a plug; said conductor being a fixed length equal to slightly more than the combined lengths of said inner and outer tubular arms; said conductor being permanently pre-coiled into a retractable spring portion having a length not greater than that of said first tubular member; whereby said conductor cord is free of slack at all times and at all adjustments of said telescopic arms.

4 Claims, 2 Drawing Sheets

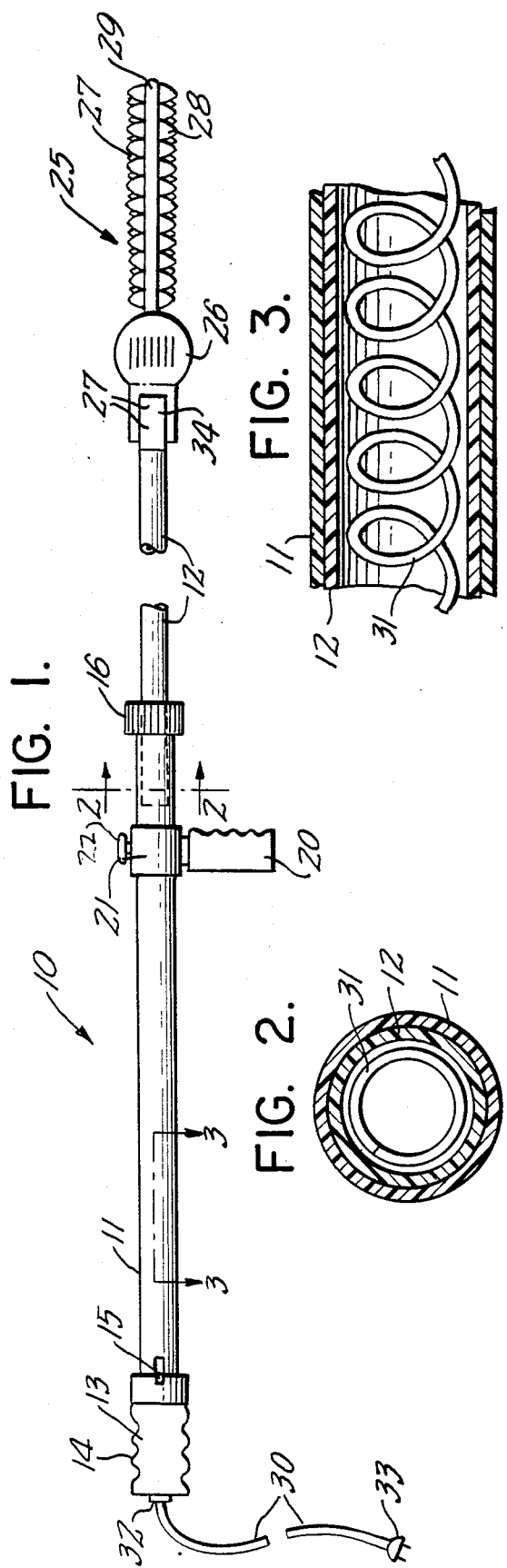
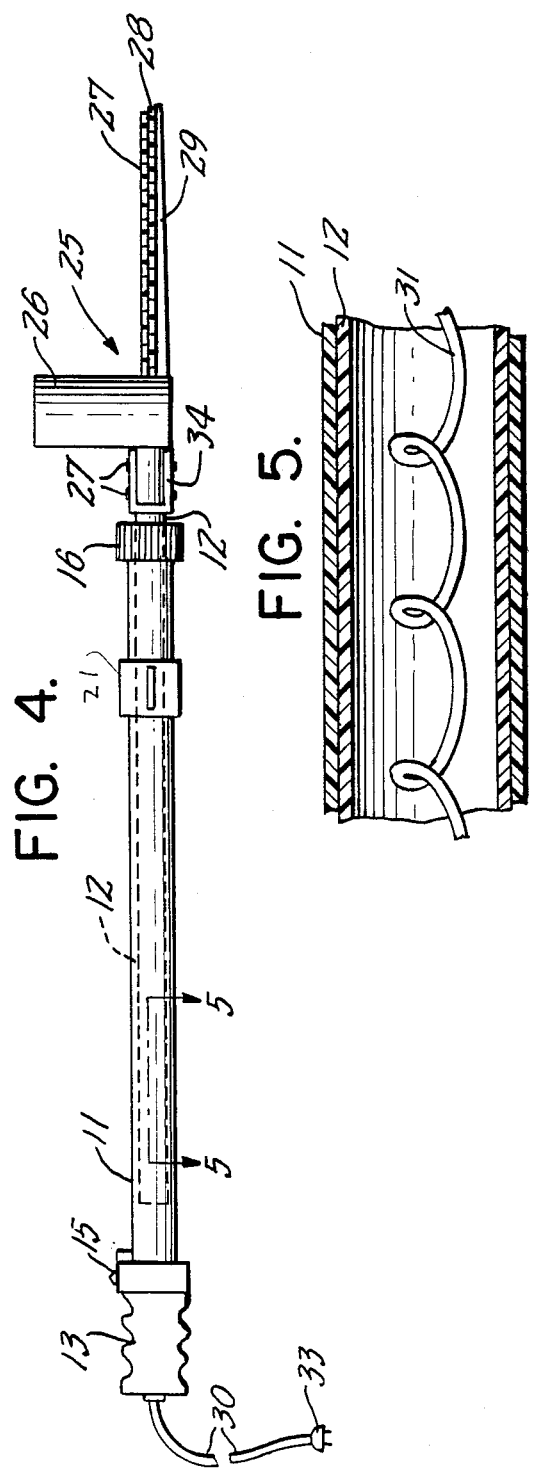

TELESCOPIC HEDGE TRIMMING APPARATUS

BACKGROUND AND SUMMARY OF INVENTION

The present invention is directed to a new and improved apparatus for trimming by hand, hedges, shrubs, and/or other trees and foliage utilizing an electric motor powered cutting instrument mounted on a telescopic pole in a manner such that branches, limbs, and the like well above the head and normal reach of the operator of the apparatus may be reached easily and comfortably without need for scaffolding, ladders or other means which must be climbed or ascended by the operator to get access to the growth to be trimmed.

While hand held pruning equipment, hedge clippers, weed trimmers and the like are well-known to the art, the use of this type of equipment for trimming high hedges, tall trees and other extended foliage which is well beyond the normal reach of the operator of such equipment has heretofore been inhibited if not prohibited. Existing equipment is limited, for safe use, to small shrubs, hedges and/or trees whose height does not substantially exceed the height of the gardener or other users of trimming/cutting apparatus.

In accordance with the principles of the present invention, electric motor-driven cutting apparatus or hedge trimming apparatus or pruning apparatus of generally well-known construction is adapted for reaching heights well above those ordinarily accessible by an operator standing on the ground. This is achieved by virtue of integrating into such cutting equipment an expandable or telescopically expandable handle mechanism especially integrated with said cutting mechanism and its power supply to enable its safe and efficient operation from the ground but at elevated heights well above and well beyond the normal reach and height of the operator. It is, of course, to be understood that telescoping poles and handles are known to the gardening art as well as to the marine art; however, these telescoping pole devices have specific limited application and none have been readily suitable for use in association with electric motor-driven cutting tools. It is to the provision of a new and improved telescopic hedge trimming apparatus and the like that the present invention is specifically directed.

For a better appreciation of the present invention and a more complete understanding of its attendant advantages, reference should be made to the following detailed description of the invention taken in conjunction with the accompanying drawings.

DESCRIPTION OF THE DRAWINGS

FIG. 1. Is a plan elevational view of the cutting apparatus of the present invention with the telescopic handle in an extended position;

FIG. 2. Is a cross-sectional view of the new apparatus taken along line 2—2 of FIG. 1;

FIG. 3. Is a fragmentary cross-sectional view of the new appartus taken along line 3—3 of FIG. 1;

FIG. 4. Is a side elevational view of the new apparatus with its telescopic handle in a fully contracted position; and FIG. 5. Is a fragmentary cross-sectional view taken along line 5—5 of FIG. 4.

DETAILED DESCRIPTION OF THE PRESENT INVENTION

Referring now to FIGS. 1 and 4, the new and improved telescopic hedge trimming apparatus of the present invention 10 comprises an elongated outer telescopic tubular arm 11 of approximately 5.0 feet in length fabricated from an insulating lightweight rigid strong material such as Fiberglass Reinforced Polyester (FRP) within which is slidingly telescopically mounted over an inner tubular elongated arm 12 manufactured of similar FRP material and having a length of approximately 4.5 feet. The outer tubular arm 11 has a hand grip member 13 affixed to its lower end which hand grip has a contoured surface 14 adapted to comfortably support the fingers of the hand of the user and which further includes an electrical push button switch 15 which is normally biased to an "off" position in accordance with the principles of the invention. The handle 13 is made from a resilient rubber-like or synthetic rubber material so as to provide cushioning as well as electrical insulation to the new apparatus.

At the upper end of the outer tubular arm 11 is a locking ring 16 which is cammingly wedged or otherwise mechanically connected to the arm 11 in a manner whereby it can lockingly grip the inner tubular arm 12 at a selectively extended position such as shown in FIG. 1 or in a fully contracted position as shown in FIG. 4. The locking ring may have an internal eccentric locking means (not shown) well known to the telescopic pole art or may be otherwise configured with means to securely lock the inner tubular member to the outer tubular member in an infinitely adjustable series of positions between fully extended and fully contracted as will be understood. It is also to be understood that in lieu of an external locking ring 16, other well known expedients for selectively adjusting an internal tubular arm telescopically with respect to an outer tubular arm such as a detents means may be employed if desired or necessary.

In accordance with the principles of the invention, a second handle 20 manufactured from the same or similar resilient insulating rubber or rubber-like material employed for the first handle 13 is mounted through a collar to the outer surfaces of the tubular arm 11. In accordance with the principles of the invention the collar 21 may be slid lengthwise of the tubular arm 11 so that the handle grip 20 may be adjusted with relation to the handle grip 13 in terms of longitudinal spacing; in addition, the collar 21 may be rotated about the axis of the tubular arm 11 so that the handle 20 may be adjusted radially with respect to the cutting device 25 which is mounted at the upper most end of the inner arm 12 as will be described in detail hereinafter. More specifically, a locking screw 22 associated with collar 21 is adapted to lock the collar in the desired adjusted position so as to maintain the handle 20 in the proper orientation and spacing with regard to the handle 13.

In a preferred embodiment of the invention, the cutting device 25 which is mounted at the end of the telescoping arms 11, 12 is a double-edged blade hedge clipper driven by an electric motor 26 which reciprocates a blade 27 back and forth adjacent a fixed blade 28 mounted on a support 29 in known fashion. The motor 26 may be bolted through bolts 27 and bracket 34 or otherwise suitably fastened permanently or semi-permanently to the upper end of the inner tubular arm 12. As will be understood, in lieu of a hedge trimming apparatus, other motor-driven foliage or tree trimming apparatus such as a minature chain saw may be employed.

As an important aspect of the present invention the insulated, 3 wire power cord 30 for the motor 26 is in the form of a coiled spring 31 which in its retracted position fits snugly within the confines of the inner tubular arm 12. The cable coil 31 extends through the inner arm and is adapted, in accordance with the principles of the invention, to expand in length while decreasing in diameter to whatever the expanded relationship of the telescoping arms 11, 12 is set at. The end of the cord 30 projects through the handle 13 where it is fastened by a fitting 32, and terminates in a plug 33.

The power cable 30 in its tightly coiled, retracted condition is shown schematically in FIG. 2 and FIG. 5. The cord in its generally extended or stretched condition is shown schematically in FIG. 3.

In use a tall hedge may be trimmed by an operator standing on the ground by extending the tubular arms 11, 12 to a desired length which can then be fixed by locking the ring 16. The handle 20 is then adjusted axially and radially with respect to handle 13 for comfortable and balanced support of the trimmer for the set length of the arms 11, 12. The cord 30 is plugged into a power supply (not shown) and the unit is set for operation by depression of the switch 15. If the unit is dropped or pressure released from the switch 15 (a "dead man's switch") the unit will be shut off since the switch is biased to a normally "off" position and it must be constantly depressed to operate the motor 26 driving the cutter blades. Thus, the new unit provides safe and efficient operation.

Advantageously, for use in an apparatus as described hereinabove in which the extended length of the telescoping inner and outer tubular arms is approximately nine feet, the wire coil 31 has a diameter of approximately 1.25 inches in the retracted position of FIG. 4 and approximately 0.75 inches in the stretched position of FIG. 2. The coiled wire can readily stretch in a ratio of approximately 10:1.

It will be appreciated that with the new design there is no slack in the power cord 30, which is self-tensioning, and that the tubular arms 11, 12 serve to armor the power cord during use.

While the foregoing description has been given by way of a preferred embodiment related to hedge trimming apparatus of a particular configuration, it will be understood by those skilled in the art that other forms of the invention falling within the ambit of the following claims is contemplated, including the use of an electric chain saw or an electric pruning device in lieu of an electric hedge trimmer.

Accordingly, reference should be made to the following appended claims in determining the full scope of the invention.

I claim:
1. A telescopic cutting apparatus comprising:
   (a) an elongated outer tubular arm of not less than four feet in length;
   (b) a first handle means coaxial with and closing off the lower end of said tubular arm;
   (c) a biased electrical on/off switch means disposed within said handle means and being normally in the "off" position and requiring constant application of force to be translated into the "on" position. (d) a second handle means mounted proximate the upper end of said outer tubular arm;
   (e) adjustment means for varying the positioning of said second handle means axially and radially with respect to said outer tubular arm;
   (f) an inner tubular elongated arm telescopically mounted within said outer tubular arm;
   (g) locking means associated with said inner and outer tubular arms to lock said inner arm in selected relation to each;
   (h) trimming means having an electrical motor drive mounted on the upper end of said inner arm;
   (i) a conductor cord extending from said motor internally through said arms in series with said switch means and outwardly of said first handle means and terminating in a plug;
   (j) said conductor being a fixed expanded length equal to slightly more than the combined lengths of said inner and outer tubular arms;
   (k) said conductor being permanently pre-coiled into a retractable spring portion having a contracted length not greater than that of said first tubular member;
   (l) whereby said conductor cord is free of slack from its expanded length to its contracted length at all times and at all adjustments of said telescopic arms.
2. The cutting apparatus of claim 1 in which
   (a) said trimming apparatus is a double-edge hedge trimmer with a reciprocating blade.
3. The resulting apparatus of claim 1 in which
   (a) said trimming apparatus is a miniature pruning saw.
4. The cutting apparatus of claim 1 in which
   (a) said first handle means has molded finger grips;
   (b) said switch is mounted adjacent to said grips.

* * * * *